E. Marble,
Washing Machine,

Nº 63,644. Patented Apr. 9, 1867.

Witnesses;
Sylvanus D Locke
Pliny Norcross

Inventor;
Eleazer Marble

United States Patent Office.

ELEAZER MARBLE, OF HANOVER, WISCONSIN.

Letters Patent No. 63,644, dated April 9, 1867.

---

IMPROVED WASHING MACHINE.

---

*The Schedule referred to in these Letters Patent and making part of the same.*

---

TO ALL WHOM IT MAY CONCERN:

Be it known that I, ELEAZER MARBLE, of Hanover, Rock county, in the State of Wisconsin, have invented a new and improved Washing Machine; and I do hereby declare that the following is a full and exact description thereof, reference being had to the accompanying drawings, in which—

Figure 1:
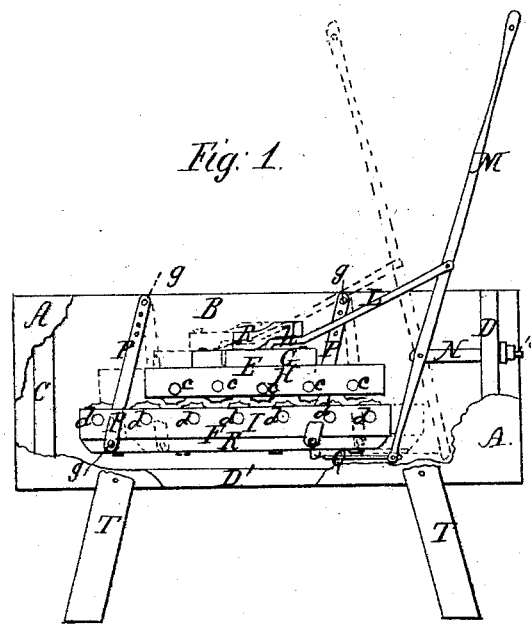
Figure 1 is a side view or elevation, with side broken away so as to show interior construction and arrangement of parts.
Figure 3:
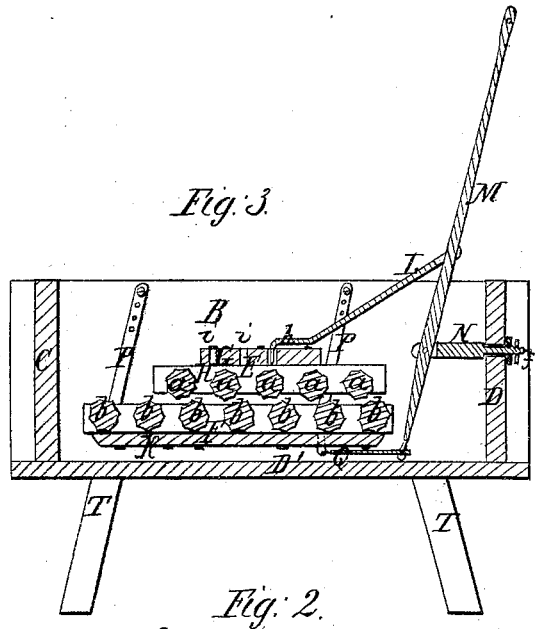
Figure 3 is a longitudinal vertical section thereof.
Figure 2:
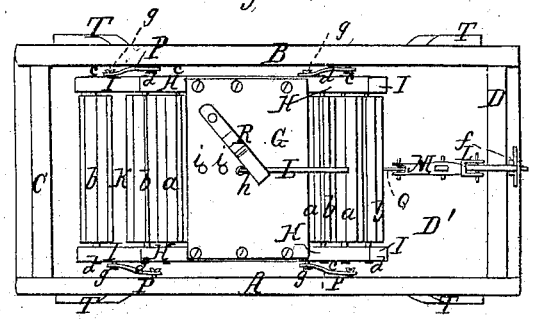
Figure 2 is a top view of the same.

The nature of my invention consists in the employment of corrugated rollers arranged horizontally and parallel to each other, substantially as hereinafter described, and combined in two series, attached to separate frameworks, one above the other, the one above resting on the lower and the lower supported on a swinging frame; the two series, upper and lower, being attached respectively above and below the fulcrum of an upright operating lever in such a manner that when the lever is operated the two series of corrugated rollers are moved in opposite directions over the face of any garment placed between them.

To enable others skilled in the art to make and use my invention, I will proceed to describe its construction and operation.

I construct the box A B C and D of any desired form, and provide it with suitable support, as the legs T. Within the box are the corrugated rollers $a$ $b$, that are arranged in two series, E and F, and that take bearing at $c$ and $d$ in their respective frameworks G H and I K. The upper series E rests upon the lower series F and is connected by the rod L to the upper arm of the upright operating lever M, that is pivoted to the stud or fulcrum bar N, that in turn is firmly secured by nut $f$ or otherwise to the end D of box. The lower series F is supported by the swinging or pendulum bars P, and is attached thereto by screws or pivot-pins $g$. The pendulum bars P are attached at their upper ends to the sides of the box by pins that pass through the bars and sides, as shown. These pendulum bars are readily lengthened or shortened at pleasure by means of the series of holes in their upper ends, as shown in drawings, thereby enabling the operator to raise or lower the series of corrugated rollers so as to immerse the clothes the requisite depth, whatever may be the amount of water used. This series F is connected to the lower arm of the upright operating lever M by the connecting-rod Q in any secure and skillful manner. The rod L has its end $h$ turned downwards so as to be readily placed in one of the mortises or holes $i$ in the cross-bar G, and there secured by the button R.

To operate my machine it is only necessary that the clothes be spread between the two series E and F of the corrugated rollers; that the box A B C and D contain the requisite amount of water or suds; and that the lever M be operated. To spread the clothes between the two series E and F I remove the upper screws E entirely from the box. To this end the connecting-rod L may be detached from the series by turning the button R and withdrawing the end $h$.

I am aware that two series of rollers, operated by gear, and fixed as to altitude in box, have been used, and I do not claim them *per se*, or independently of the manner of supporting, adjusting, and operating them.

What I do claim, and for which I desire Letters Patent, is —

The combination and arrangement of the two series of corrugated rollers E and F, with the adjustable pendulum bars P, substantially as and for the purpose set forth.

ELEAZER MARBLE.

Witnesses:
SYLVANUS D. LOCKE,
PLINY NORCROSS.